(12) United States Patent
Kosma et al.

(10) Patent No.: US 11,565,972 B2
(45) Date of Patent: Jan. 31, 2023

(54) BITUMEN NANOCOMPOSITES AND USES THEREOF

(71) Applicant: Cornell University, Ithaca, NY (US)

(72) Inventors: Vasiliki Kosma, Ithaca, NY (US); Emmanuel P. Giannelis, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 0 days.

(21) Appl. No.: 16/327,839

(22) PCT Filed: Aug. 25, 2017

(86) PCT No.: PCT/US2017/048569
§ 371 (c)(1),
(2) Date: Feb. 24, 2019

(87) PCT Pub. No.: WO2018/039534
PCT Pub. Date: Mar. 1, 2018

(65) Prior Publication Data
US 2019/0194071 A1 Jun. 27, 2019

Related U.S. Application Data

(60) Provisional application No. 62/379,441, filed on Aug. 25, 2016.

(51) Int. Cl.
| | | |
|---|---|---|
| *C04B 26/26* | (2006.01) |
| *C04B 14/10* | (2006.01) |
| *C04B 18/22* | (2006.01) |
| *C04B 24/26* | (2006.01) |
| *C08L 17/00* | (2006.01) |
| *C08L 95/00* | (2006.01) |
| *C09D 7/40* | (2018.01) |
| *C09D 7/62* | (2018.01) |
| *C09D 7/00* | (2018.01) |
| *C08L 53/02* | (2006.01) |
| *C08K 13/04* | (2006.01) |
| *C04B 111/00* | (2006.01) |
| *C04B 111/27* | (2006.01) |

(52) U.S. Cl.
CPC ............ *C04B 26/26* (2013.01); *C04B 14/104* (2013.01); *C04B 18/22* (2013.01); *C04B 24/2676* (2013.01); *C08L 17/00* (2013.01); *C08L 95/00* (2013.01); *C09D 7/00* (2013.01); *C09D 7/62* (2018.01); *C09D 7/68* (2018.01); *C04B 2111/0075* (2013.01); *C04B 2111/00586* (2013.01); *C04B 2111/27* (2013.01); *C08K 13/04* (2013.01); *C08L 53/02* (2013.01)

(58) Field of Classification Search
CPC ......... C04B 26/26; C04B 14/10; C04B 18/22; C04B 24/26
USPC ....................................................... 524/68
See application file for complete search history.

(56) References Cited

U.S. PATENT DOCUMENTS

| | | | | |
|---|---|---|---|---|
| 4,485,201 A | * | 11/1984 | Davis ...................... | C08L 95/00 524/68 |
| 4,992,492 A | | 2/1991 | Sainton | |
| 5,501,730 A | | 3/1996 | Duong et al. | |
| 5,652,284 A | * | 7/1997 | Eidt, Jr. .................. | C08L 53/02 524/59 |
| 5,889,119 A | * | 3/1999 | Coran ...................... | C08J 11/06 525/232 |
| 8,114,926 B2 | | 2/2012 | Dupuis et al. | |
| 8,298,662 B2 | | 10/2012 | Samanta et al. | |
| 8,664,303 B2 | | 3/2014 | Martin | |
| 2002/0177004 A1 | | 11/2002 | Terry | |
| 2004/0059028 A1 | * | 3/2004 | Burris ................... | C08L 19/003 524/62 |
| 2007/0221095 A1 | * | 9/2007 | Mehta ..................... | C08L 95/00 106/280 |
| 2011/0184090 A1 | | 7/2011 | De Jonge et al. | |
| 2015/0184026 A1 | * | 7/2015 | Quintero Rangel .... | C08L 53/02 524/68 |
| 2015/0361318 A1 | | 12/2015 | Crews et al. | |
| 2017/0137717 A1 | | 5/2017 | Palmer et al. | |

FOREIGN PATENT DOCUMENTS

| | | | |
|---|---|---|---|
| BG | 63807 B1 | | 1/2003 |
| CN | 104212191 | * | 12/2014 |
| EP | 2055745 A1 | | 5/2009 |
| EP | 2264104 | * | 12/2010 |
| EP | 2264104 A1 | | 12/2010 |
| EP | 1877492 B1 | | 12/2014 |
| EP | 3124546 A1 | | 2/2017 |

(Continued)

OTHER PUBLICATIONS

Salehfard, R., et al., Effect of SBR/NC on the Rheological Properties of Bitumen and Fatigue Resistance of Hot Mix Asphalt, J. Mater. Civ. Eng., May 30, 2017, vol. 29, No. 5, 9 pages.

Jianying, Y., et al., Effect of Organophilic Montmorillonite on Thermal-oxidative Aging Behavior of SBS Modified Bitumen Crack Filling Material, Journal of Wuhan University of Technology—Materials Science Edition, Aug. 2009, vol. 24, No. 4, pp. 673-676.

Farias, L.G.A.T., et al., Effects of nanoclay and nanocomposites on bitumen rheological propertiesConstruction and Building Materials, Oct. 30, 2016, vol. 125, pp. 873-883.

Merusi, F., et al., A model combining structure and properties of a 160/220 bituminous binder modified with polymer/clay nanocomposites. A rheological and morphological study, Materials and Structures, May 2014, vol. 47, No. 5, pp. 819-838.

(Continued)

*Primary Examiner* — Deve V Hall
(74) *Attorney, Agent, or Firm* — Paul J. Roman, Jr.; Johnson, Marcou, Isaacs & Nix, LLC

(57) ABSTRACT

Provided are bitumen nanocomposites. The bitumen nanocomposites have one or more clay, one or more polymer composition, and bitumen. A polymer composition can have one or more polymer and one or more crumb rubber. A polymer may have one or more maleic anhydride group. The bitumen nanocomposites can be used in, for example, road surfacing products and roofing products.

20 Claims, 14 Drawing Sheets

(56) References Cited

FOREIGN PATENT DOCUMENTS

| JP | 08176449 A | * | 7/1996 |
| RU | 2222559 C1 | | 1/2014 |
| WO | 2011/074003 A2 | | 6/2011 |

OTHER PUBLICATIONS

Lo Presti, D., Recycled Tyre Rubber Modified Bitumens for road asphalt mixtures: A literature review, Construction and Building Materials, Dec. 2013, vol. 49, pp. 863-881.

Xiang, L., et al., Preparation Technology and Performance Analysis of Crumb Rubber and SBS Composite Modified Asphalt Binder, Advanced Materials Research, 2011, vol. 160-162, pp. 1320-1324.

Bagshaw, S., Bitumen/clay nanocomposites: improving bitumen properties for waterproof roads, Linking People, Places and Opportunities: 27th ARRB Conference, Nov. 16-18, 2016, 1 page.

González, V., et al., "Thermomechanical properties of bitumen modified with crumb tire rubber and polymeric additives," Fuel Processing Technology 91 (2010), all enclosed pages cited.

Golestani, B., et al., "Performance evaluation of linear and nonlinear nanocomposite modified asphalts," Construction and Building Materials 35 (2012), all enclosed pages cited.

Liang, M., et al., "Investigation of the rheological properties and storage stability of CR/SBS modified asphalt," Construction and Building Materials 74 (2015), all enclosed pages cited.

* cited by examiner a b

C d a b a b

BITUMEN NANOCOMPOSITES AND USES THEREOF

CROSS REFERENCE TO RELATED APPLICATIONS

This application claims priority to U.S. Provisional Application No. 62/379,441, filed on Aug. 25, 2016, the disclosure of which is hereby incorporated by reference.

FIELD OF THE DISCLOSURE

The disclosure generally relates to bitumen-clay-crumb rubber nanocomposites. More particularly, the disclosure relates to bitumen-clay-crumb rubber nanocomposites with additional polymer additives.

BACKGROUND OF THE DISCLOSURE

Bitumen is used extensively for road surfacing and roofing materials. It is obtained from the distillation of crude oil and contains a chemically complex mixture, which is classified typically according to the polarity of the constituents roughly into asphaltenes and maltenes; maltenes can be further separated by chromatographic techniques to saturates, aromatics, resins and altogether are referred to with the acronym SARA fractions. A satisfactory description of bitumen is that it is colloid. It has been suggested that asphaltenes form micelles and are dispersed in maltenes stabilized by the polar fraction of the latter.

The primary use of bitumen is in asphalt, where it serves as the glue or binder mixed with mineral aggregate (stone or sand) particles. Recent advances for bitumen used for pavement applications include addition of various polymers in order to improve performance and reduce rutting, cracking and water susceptibility.

Styrene-butadiene-styrene triblock copolymers (SBS) have proved very effective as polymer additives in bitumen. SBS shows good dispersability with good final properties, though storage stability issues still need to be resolved; the level of SBS addition in the bitumen matrix is limited to 3 to 6% wt. The reason is that higher loadings improve further the properties but they lead to phase separation and settling during storage. Various attempts for stabilizing SBS modified binders have been reported in the last several years. It was previously reported that successfully adding sulfur to SBS improving storage stability of bitumen. Even earlier work starting as early as 1958 describes a storage-stable SBS-modified asphalt by adding sulfur, though due to the excessive viscosity, the product could not be used in practice. Although the addition of sulfur has been exploited industrially for more than 30 years there still remain some issues; modified binders are more susceptible to oxidative aging; in addition hydrogen sulfide, a hazardous gas, can be generated during sulfur vulcanization. Another important drawback is poor recyclability, which might be caused by the chemical reactions of sulfur during the vulcanization process.

The use of nanoclays and other nanoparticles to improve the properties of polymers is already well documented. Similarly, several have reported nanoclay-bitumen nanocomposites. Addition of organo-modified montmorillonites (O-MMT) to bitumen without any polymer additives was previously reported and it was noticed that clays can improve the short-term aging behavior. However, the material still settled in long-term aging tests. A better aging behavior was reported later, but these researchers used an SBS modified bitumen as the matrix. A combination of SBS and hydrophobic MMT led to increased viscosity, higher stiffness and better rutting resistance though storage stability still remains a problem. Previous reports used organically modified vermiculite and montmorillonite and noticed that the binder modified by 2.5% of SBS and 2.5% of clays showed a similar behavior to the binder modified by 4.0% of SBS, which confirms that the nanoclays can serve as inexpensive substitutes for polymer additives. However, only the vermiculite based system showed improved storage stability.

Several papers report potential improvements to bitumen by using blends of polymers as additives. A previous report described using an experimental design analysis approach and optimized the conditions of blending SBS, crumb rubber and a polyethylene wax (PW), aiming mainly at the reduction of production costs. Crumb rubber (CR), which is produced from recycling rubber tires, is a promising additive especially for substituting part of SBS; considering that billions of tires are produced every year and a large part of them is eventually discarded without any further use, it is of considerable practical interest to substitute part of SBS with the less expensive CR without compromising performance. A previous report replaced part of SBS with crumb rubber to produce CR/SBS modified binders and noticed a significant improvement in failure temperature, moduli and viscosity, when the amount of SBS exceeded 1%. However, their CR/SBS-modified system shows obvious phase separation upon storing resulting from coalescence of SBS on the top of the sample and sedimentation of rubber particles at the bottom.

SUMMARY OF THE DISCLOSURE

The present disclosure provides bitumen clay nanocomposites. For example, a bitumen clay nanocomposite comprises: a clay (e.g., 0.5 to 5 or 1 to 20% by weight clay based on the total weight of the composition); a polymer composition comprising a polymer (e.g., styrenic polymer and/or styrenic copolymer) and a crumb rubber (e.g., 1 to 5 or 1 to 20% by weight polymer composition based on the total weight of the composition); and the remainder of the nanocomposite is bitumen.

In various examples, the clay is selected from the group consisting of montmorillonites, kaolinites, illites, chlorites, vermiculites, layered double hydroxide clays (LDHs), and combinations thereof. In various examples, a montmorillonite is a modified montmorillonite. In various examples, a modified montmorillonite is an organo-modified montmorillonite.

In an example, the polymer is a styrenic polymer comprising 10 to 50 percent by weight styrenic moieties, which may comprise one or more maleic anhydride group. In an example, the styrenic polymer is a styrenic block copolymer. In various examples, the styrenic block copolymer comprises one or more polybutadiene block, one or more polyisoprene block, one or more polyethylene block, one or more polybutylene block, one or more polypropylene block, or a combination thereof, any one or more of which may have one or more maleic anhydride group covalently bonded (e.g., grafted) thereto. In various example, the styrenic block copolymer is a styrene-butadiene copolymer, styrene-isoprene copolymer, styrene-ethylene copolymer, styrene-butylene copolymer, styrene-propylene copolymer, or a combination thereof, any one or more of which may have one or more maleic anhydride group covalently bonded (e.g., grafted) thereto.

In an example, the crumb rubber has an average particle size (e.g., longest dimension) of 100 microns to 1,000 microns. In various examples, the polymer composition comprises 10 to 90% by weight styrenic polymer or styrenic copolymer based on the total weight of the polymer composition and 10 to 90% by weight crumb rubber (CR) based on the total weight of the polymer composition.

The present disclosure also provides products comprising one or more bitumen nanocomposite of the present disclosure. For example, a road surfacing product (e.g., an asphalt) comprises one or more bitumen clay nanocomposite of the present disclosure. For example, a roofing product or waterproofing product comprises one or more bitumen clay nanocomposite of the present disclosure.

BRIEF DESCRIPTION OF THE FIGURES

For a fuller understanding of the nature and objects of the disclosure, reference should be made to the following detailed description taken in conjunction with the figures provided herein.

DETAILED DESCRIPTION OF THE DISCLOSURE

Figure 1:
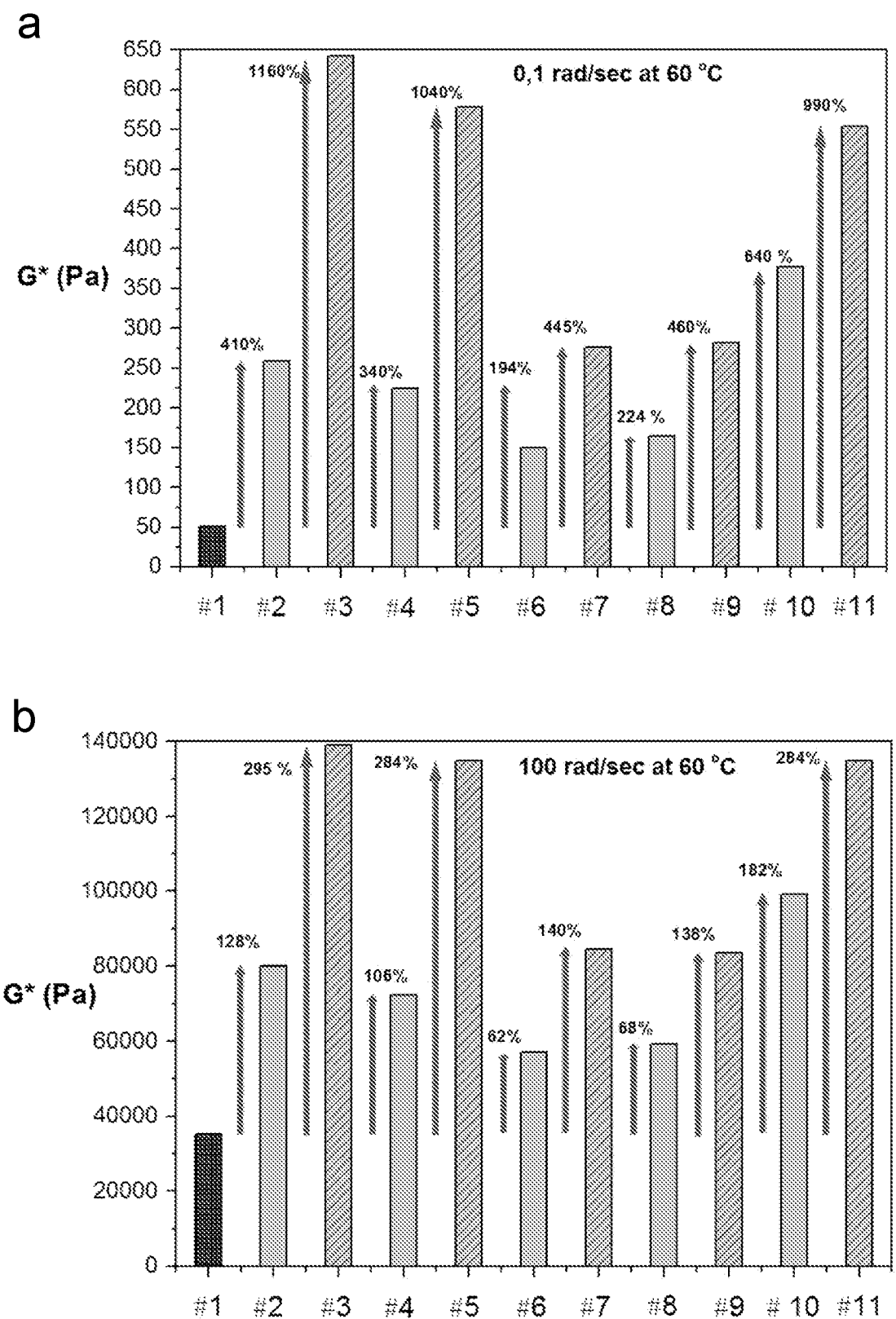
FIG. 1 shows complex modulus for all the binders studied at 60° C. at (a) 0.1 rad/s (top) and (b) 100 rad/s (bottom). Details of the sample compositions are given in Table 1.

Although claimed subject matter will be described in terms of certain embodiments, other embodiments, including embodiments that do not provide all of the benefits and features set forth herein, are also within the scope of this disclosure. Various structural, logical, and process step changes may be made without departing from the scope of the disclosure.

Ranges of values are disclosed herein. The ranges set out a lower limit value and an upper limit value. Unless otherwise stated, the ranges include all values to the magnitude of the smallest value (either lower limit value or upper limit value) and ranges between the values of the stated range. For example, all ranges provided herein include all values that fall within the ranges to the tenth decimal place, unless indicated otherwise.

The present disclosure provides bitumen clay nanocomposites. The bitumen clay nanocomposites comprise a polymer composition (e.g., styrenic polymers, such as, for example, styrene-butadiene-styrene triblock copolymer (SBS), and crumb rubber). The bitumen clay nanocomposites can be used in products such as, for example, asphalt.

The new compositions of the present disclosure can avoid many of the shortcomings in the prior art. The nanoclays act synergistically with the polymer additives and thus requiring less polymer. As a result, the addition of nanoclays, which are inexpensive and readily blended in the matrix, leads to a significant improvement of properties both at ambient and elevated temperatures, and a stable system under storage conditions.

In an aspect, the present disclosure provides bitumen clay nanocomposites. The nanocomposites comprise bitumen, clay, and a polymer composition (e.g., styrene-butadiene-styrene triblock copolymer (SBS) and crumb rubber). In an example, a bitumen nanocomposite does not comprise elemental sulfur and/or a crosslinking reagent.

For example, a bitumen clay nanocomposite comprises 0.01 to 10% by weight clay (e.g., 0.5 to 3 or 0.5 to 5% by weight), 1 to 20% by weight polymer composition (e.g., SBS) (e.g., 1 to 5% by weight), where the polymer composition is 10 to 90% by weight (based on the total weight of the polymer composition) crumb rubber (CR) and 10 to 90% by weight (based on the total weight of the polymer composition) of one or more polymers (e.g., a polymer or polymers with 10 to 50 percent by weight styrenic block(s)), and the remainder of the composite is bitumen (e.g., 70 to 98.99% by weight or 80 to 90% by weight). The % by weight values for clay, polymer composition, and bitumen are based on the total weight of the nanocomposite.

Various bitumens can be used. Bitumen is also referred to as asphalt or asphalt cement. Bitumen can be present in the bitumen clay nanocomposites at, for example, 70 to 98.99% by weight by weight based on the total weight of the nanocomposite, including all 0.1 weight % values and ranges therebetween. In an example, the bitumen is present in the bitumen clay nanocomposites at 80 to 98% by weight. Examples of bitumen include, but are not limited to, PG 64-22 (available from Suit-Kote Corporation). Suitable bitumens are known in the art. Suitable bitumens are commercially available.

Various clays can be used. Mixtures of clays can be used. The clays can be nanoclays. Clay can be present in the bitumen clay nanocomposites at 0.01 to 10% by weight based on the total weight of the nanocomposite, including all 0.1 weight % values and ranges therebetween. In an example, the clay is present in the bitumen clay nanocomposites at 0.5 to 5% by weight. In another example, the clay is present in the bitumen clay nanocomposites at 0.5 to 3% by weight. Examples of suitable clays include, but are not limited to, montmorillonite, kaolinite, illite, chlorite, vermiculite, layered double hydroxide clays (LDHs), and combinations thereof. In various examples, an individual clay or individual clays have a 1:1 and/or 2:1-type layered structure. A 1:1 clay has one tetrahedral sheet and one octahedral sheet (e.g., kaolinite). A 2:1 clay has an octahedral sheet sandwiched between two tetrahedral sheets (e.g., montmorillonite and vermiculite). For example, layers in their crystal structure are made up of two tetrahedrally coordinated silicon atoms fused to an edge shared octahedral sheet of either aluminum or magnesium hydroxide.

For example, the clay is a montmorillonite or modified (e.g., organo modified) montmorillonite (e.g., montmorillonite modified with dehydrogenated tallow, such as, for example, dimethyl dehydrogenated tallow, alkylammonium (e.g., an alkylammonium salt), or a combination thereof), caolinite, or a layered double hydroxide clay (LDH). Examples of suitable clays include, but are not limited to, Cloisite® 20A (available from Southern Clay Products), which is a natural montmorillonite modified with a quaternary ammonium salt (e.g., the organic modifier used is 2M2HT (M: methyl and HT: is hydrogenated tallow (~65% C18; ~30% C16; ~5% C14) and the modifier concentration 2M2HT is 95 meq/100 g clay); Cloisite® 10A, which is a natural montmorillonite modified with a quaternary ammonium salt (e.g., the organic modifier is 2MBHT (M: methyl, B: benzyl and HT: is Where HT is hydrogenated tallow (~65% C18; ~30% C16; ~5% C14) and the modifier concentration 2MBHT 125 meq/100 g clay; and Cloisite® 15A, which is a natural montmorillonite modified with a quaternary ammonium salt. The organic modifier used is 2M2HT (M: methyl and HT: is Hydrogenated Tallow (~65% C18; ~30% C16; ~5% C14), where the modifier concentration 2M2HT is 125 meq/100 g clay. Suitable clays are known in the art. Suitable clays are commercially available.

The polymer composition comprises one or more polymer (e.g., a styrenic polymer and/or styrenic copolymer) and one or more crumb rubber. The polymer composition can be present in the bitumen clay nanocomposites at 1 to 20% by weight based on the total weight of the nanocomposite, including all 0.1 weight % values and ranges therebetween. In an example, the polymer composition is present in the bitumen clay nanocomposites at 1 to 5% by weight. The polymer composition can comprise 10 to 90% by weight crumb rubber (CR) and 10 to 90% by weight of one or more polymer (e.g., a polymer or polymers with 10 to 50 percent by weight styrenic moieties such as, for example, styrenic block(s)). The % by weight values for CR and polymer are based on the total weight of the polymer composition. In various examples, the polymer composition comprises 40 to 60% by weight crumb rubber (CR) and/or 40 to 60% by weight of one or more polymer (e.g., a polymer or polymers with 10 to 50 percent by weight styrenic moieties such as, for example, styrenic block(s)). In an example, the polymer composition comprises 50% by weight crumb rubber (CR) and/or 50% by weight of one or more polymer (e.g., a polymer or polymers with 10 to 50 percent by weight styrenic moieties such as, for example, styrenic block(s)).

Various polymers can be used. Mixtures of polymers can be used. The polymer composition can comprise 10 to 90% by weight, based on the total weight of the polymer composition, one or more polymers, including all 0.1 weight % values and ranges therebetween. The polymer(s) can be polymers or copolymers (e.g., block copolymers) with 10 to 50% percent by weight one or more styrenic blocks, based on the total weight of the polymer. The polymer(s) can have one or more rubber blocks such as, for example, polypropylene block(s), polybutylene block(s), polybutadiene block(s), polyisoprene block(s), polyethylene block(s), and combinations thereof. The polymer(s) can also have one or more maleic anhydride groups.

Styrenic block copolymers (SBSs) can be used. Mixtures of SBSs can be used. SBSs, commonly termed thermoplastic rubbers due to their ability to combine both elastic and thermoplastic properties, are desirable because of their relatively good dispersibility (or appropriate solubility) in bitumen and other properties. The SBSs can be, for example, linear copolymers or multi-armed copolymers (known as star-shaped, radial or branched copolymers). The SBS can have 10 to 50% by weight (based on the total weight of SBS) styrene. For example, the SBS has 30% by weight styrene. Suitable SBSs are known in the art. Suitable SBSs are commercially available and can be made by methods known in the art.

Examples of polymers include, but are not limited to, the Kraton D SBS family of polymers, which are SBS block copolymers comprising blocks of styrene and butadiene (e.g., a Kraton D polymer, SBS with 30 wt. % of styrene (available from Sigma-Aldrich); the Kraton D SIS family of polymers that are thermoplastic elastomers, which are SIS block copolymers comprising styrene and isoprene blocks; Kraton G SEBS and SEPS polymers (styrenic thermoplastic block copolymers) that comprise a hydrogenated midblock of styrene-ethylene/butylene-styrene (SEBS) or styrene-ethylene/propylene-styrene (SEPS). In an example, the polymer is a Kraton FG polymer (SEBS polymers with maleic anhydride (MA) grafted onto the rubber midblock). For example, the Kraton FG polymers have 1.0 to 1.7 wt. % MA grafted onto the block copolymer. In various examples, a styrenic block copolymer comprises one or more polybutadiene block, one or more polyisoprene block, one or more polyethylene block, one or more polybutylene block, one or more polypropylene block, or a combination thereof. In various examples, a styrenic block copolymer is a styrene-butadiene copolymer, styrene-isoprene copolymer, styrene-ethylene copolymer, styrene-butylene copolymer, styrene-propylene copolymer, or a combination thereof.

A polymer (e.g., a styrenic polymer or styrenic copolymer) can have one or more maleic anhydride group covalently bound to the polymer. A maleic anhydride group is derived from maleic anhydride (e.g., a covalent bond is formed to a maleic anhydride molecule by substitution of one or more atom, such as, for example, a hydrogen atom, of the maleic anhydride molecule for a covalent bond). In various examples, one or more maleic anhydride group is/are independently covalently bonded to the polymer backbone, a side chain, a terminal group of the polymer, and may be, in each of these cases, covalently bound via a linking group. In various examples, one or more blocks of a styrenic polymer or styrenic copolymer are grafted with maleic anhydrides. Methods of covalently bonding one or more maleic anhydride group to a polymer are known in the art. For example, suitable grafting methods are known in the art. A polymer (e.g., a styrenic polymer or styrenic copolymer) can have various amounts of maleic anhydride group(s). In an example, a polymer (e.g., a styrenic polymer or styrenic copolymer has 0.1 to 10 parts per hundred polymer (php), including all 0.1 php values and ranges there between.

Various CRs can be used. Mixtures of CRs can be used. CR can be present in the polymer composition at 10 to 90% by weight based on the total weight of the polymer composition, including all 0.1 weight % values and ranges therebetween. Such CRs can be produced by grinding rubber. For example, the crumb rubber is produced by ambient temperature grinding. In this method tires are ground at or above room temperature. This process leads to irregularly shaped, torn particles with relatively large surface areas that promotes interaction with the bitumen. Other grinding methods include cryogenic grinding, wet-grinding, and hydro jet size reduction. Ambient processed CR may be desirable as it can provide better performance compared to its cryogenic counterparts because of its larger surface area and subsequent swelling rate. For example, the crumb rubber is 30-mesh crumb rubber available from, for example, Crumb Rubber Manufacturers (CRM). In an example, the crumb rubber has an average particle size (e.g., longest dimension) of 100 microns to 1,000 microns, including all integer micron values and ranges therebetween. Suitable CRs are known in the art. Suitable CRs are commercially available and can be made by methods known in the art.

The bitumen nanocomposites have desirable morphology. In various examples, a bitumen nanocomposite has an intercalated morphology and/or an exfoliated morphology.

The bitumen nanocomposites can be made using methods described herein. For example, the bitumen nanocomposites can be made following a wet process for the preparation of the binders, which is a common way of making rubberized asphalt, that entails adding the crumb rubber to the binder (e.g., before mixing it with aggregate).

The bitumen nanocomposites have desirable properties. In various examples, the nanocomposites have a complex modulus (e.g., measured as described herein) of 450 Pa or greater, 500 Pa or greater, or 550 Pa or greater measured at 0.1 rad/sec at 60° C. In various examples, the nanocomposites have a complex modulus (e.g., measured as described herein) of 110,000 Pa or greater, 120,000 Pa or greater, or 130,000 Pa or greater measured at 100 rad/sec at 60° C. In various examples, the nanocomposites have a rutting factor (e.g., measured as described herein) of 20,000 [G*/sin(delta)]/Pa or greater, 21,000 [G*/sin(delta)]/Pa or greater, or 22,500 [G*/sin(delta)]/Pa or greater measured at 10 rad/sec at 60° C.

In various examples, a bitumen nanocomposite does not exhibit phase separation (e.g., observable phase separation) for at least 24 hours, at least 48 hours, or at least 60 hours, at least 5 days, at least 10 days, or at least 14 days. The presence or absence of phase separation can be determined by methods known in the art. For example, the presence or absence of phase separation is determined by methods disclosed herein.

The bitumen nanocomposite exhibits desirable storage stability without the need for vulcanization of the nanocomposite or a cross-linking reaction/cross-linking reactions of the nanocomposites. In an example, a bitumen nanocomposite does not comprise elemental sulfur and/or a cross-linking reagent.

In an aspect, the present disclosure provides uses of bitumen clay nanocomposites of the present disclosure. The nanocomposites can be used in various products.

For example, the bitumen clay nanocomposites can be used as a component in road surfacing products (e.g., asphalts). The nanocomposites can be used as a component (e.g., an additional component and/or a substitute for one or more component) in road surfacing products (e.g., asphalts) known in the art.

In an example, a road surfacing product (e.g., an asphalt) comprises one or more bitumen clay nanocomposite of the present disclosure. The road surfacing product can further comprise mineral aggregate (e.g., sand and/or stone). The aggregate can be fine or course aggregate (e.g., sand). For example, a road surfacing product comprises 10% by weight one or more bitumen clay nanocomposite and 90% by weight fine aggregates (sand). The road surfacing products (e.g., asphalt) comprising one or more bitumen clay nanocomposite of the present disclosure have desirable properties. In various examples, the road surfacing products (e.g., asphalt, bitumen clay nanocomposite aggregate nanocomposite) have a higher flexural stress than unmodified bitumen (e.g., 100% or more greater, 200% or more greater, 300% or more greater, or 400% or more greater than unmodified bitumen).

In other examples, the bitumen clay nanocomposites can be used as a component in roofing or waterproofing products. The nanocomposites can be used as a component (e.g., an additional component and/or a substitute for one or more component) in roofing or waterproofing products known in the art.

The following example is presented to illustrate the present disclosure. They are not intended to limiting in any matter.

Example 1

This example provides a description of making, characterizing, and using clay nanocomposites of the present disclosure.

In this example, a new family of clay nanocomposites based on bitumen modified by CR/SBS was demonstrated. Binders based on low polymer content additives and a total of 3% wt clay were explored. The new compositions appear to avoid many of the shortcomings described herein. The nanoclays act synergistically with the polymer additives and thus requiring less polymer. As a result, the addition of nanoclays, which are inexpensive and readily blended in the matrix, leads to a remarkable improvement of properties both at ambient and elevated temperatures, and a stable system under storage conditions. In addition to the significantly practical applications in bitumen systems, the work provides basis for substitution of copolymers and other polymer additives (e.g., SBS, EVA, and others) with the lower cost and recyclable crumb rubber taking advantage of the stabilization effect of inorganic nanoparticles and providing systems with both environmental and economic benefits.

Bitumen-clay nanocomposites (e.g., binders) with styrene-butadiene-styrene triblock copolymer, SBS, and combinations of SBS and crumb rubber (CR) with different CR/SBS ratios were synthesized and characterized. In addition to the nanocomposites (e.g., binders), samples containing the nanocomposite and concrete sand (with a weight ratio 1:9) were prepared. The modified binders were studied in terms of filler dispersion, storage stability, mechanical performance and water susceptibility. It was demonstrated that the samples containing nanoclays consistently outperform those based only on the polymer additives. It was also found that nanocomposite samples based on a combination of SBS and CR are desirable, since in addition to other improvements they show desirable storage stability. It was shown that substituting CR with SBS as a bitumen additive and combining it with nanoclays, which are relatively inexpensive, leads to new materials with enhanced performance and improved stability, as an example, for practical asphalt applications.

Experimental. Materials. Bitumen grade PG 64-22 (Suit-Kote Corporation), poly(styrene-b-butadiene-b-styrene) (SBS) with 30% wt of styrene (Aldrich) and crumb rubber (CR) prepared from waste tires using ambient temperature grinding (30-mesh, Crumb Rubber Manufacturers, CRM) were used as received. Cloisite 20A (herein referred to as 20A), a montmorrillonite modified with dimethyl dehydrogenated tallow alkylammonium was obtained from Southern Clay Products. Concrete sand with particle size less than 0.84 mm (0.0331 inches) was used as received.

Sample Preparation. Samples were prepared using a VWR 14215-268 General Purpose Mixer at 185° C. and a mixing time of 2.5 hours. Initially, base bitumen was heated and gradually SBS and crumb rubber were added and melted during the first 1.5 h (h=hour(s)) of mixing; then clay was added and mixed allowing for full macroscopic homogenization for an additional 1 hour. In order to evaluate the effect of polymers and clays in bitumen's final performance, base bitumen was subjected to the same thermal treatment as the PMB (polymer modified bitumen) blends and was used as reference. The concentration of SBS ranged from 0.5 to 3.0% wt., for CR from 0 to 2.5% wt, whereas clay 20A level was either 0% or 3.0% wt. All PMB combinations prepared and characterized are shown in table 1. Binder (PMB) and concrete sand (uniform sized) (with a weight ratio 1:9) were mixed at 185° C. for 2 hours until a homogeneous mixture was obtained and samples for testing were hot pressed at 150° C. for 15 min.

Rheological measurements. Rheological measurements were carried out on an Anton-Paar rheometer using frequency sweeps from 0.1 to 100 rad/s at 25° C. and 60° C. in the linear viscoelastic region, using parallel plate geometry with a diameter of 25 mm. The final gap was adjusted to 1 mm and before each measurement the samples were kept at 100° C. for 15 min (min=min(s)).

SEM, TEM Microscopy. Surface morphology was observed through a field emission scanning electron microscope (FE-SEM, Tescan Mira3). Before imaging, samples were dried and sputter-coated with a layer of carbon (Denton Vacuum BTT-IV). Specimens for Transmission Electron Microscopy (TEM) were microtomed in ultrathin sections (approximately 50-100 nm thick) at −20 to −30° C. using a Leica Ultracut UC7/FC7 Cryo-ultramicrotome equipped with a DIATOME diamond knife. The samples were imaged using a FEI Tecnai G2 T12 Spirit TEM operating at an acceleration voltage of 120 kV.

XRD. X-ray powder diffraction data were collected on a Scintag Theta-Theta X-ray Diffractometer (XRD) equipped with Cu Ka (40 kV, 40 mA) radiation and a germanium detector. The patterns were recorded in the 2-theta (2θ) range from 2° to 120°, in steps of 1° and counting time 2 s (s=second(s)) per step.

Storage Stability Tests. High temperature storage tests were used to evaluate storage stability. Samples were poured into a Teflon tube (diameter: 2.5 cm, height: 14 cm) and vertically placed in an air-circulating oven at 163° C. for 48 h. Subsequently, the tube was removed from the oven and stored in a refrigerator at −25° C. Once cooled, the tube was cut into three parts of equal length; the middle part was discarded and the remaining two parts were collected for rheological observations.

Mechanical testing and modified Texas Freeze-Thaw Pedestal Test. Three point bending flexular tests were performed on an Instron (5569) instrument. Specimens 50×20×5 mm were prepared by hot pressing as described above. At least 4 freshly prepared specimens were tested using a speed of 2 mm/min.

In order to evaluate the impact of water on the adhesion between aggregate and asphalt binder, under harsh conditions, we chose a modified Texas Freeze-Thaw Pedestal Test. In the original test, miniature asphalt-aggregate samples (cylindrical shape and diameter 2 cm) made of 5% wt bitumen and 95% wt fine aggregate particles are placed on a pedestal in a covered jar of distilled water and are subjected to repeated freeze-thaw cycles (15 hours at −12° C. and 9 hours at 50° C.) in distilled water. In our study, rectangular specimens made of 10% wt PMB and 90% wt fine aggregate particles (similar to the ones used for mechanical testing) were used. Samples were placed horizontally in covered baths of distilled water. In addition to the daily examination of the samples at the end of each 24 h cycle for possible appearance of cracks we also performed three point bending test after 7 days of full cycles. The samples were kept in distilled water for 15 hours at −25° C. and 9 hours at 50° C., respectively.

Results and Discussion. Dynamic Rheological Properties.

TABLE 1

Codes for polymer/clay modified bitumen samples.

| Binders | |
|---|---|
| #1 | Bitumen treated at 185° C. for 2.5 h |
| #2 | 3.0% wt SBS/Bitumen |
| #3 | 3.0% wt 20A, 3.0% wt SBS/Bitumen |
| #4 | 2.0% wt SBS, 1.0% wt CR/Bitumen |
| #5 | 3.0% wt 20A, 2% wt SBS, 1.0% wt CR/Bitumen |
| #6 | 2.5% wt SBS, 0.5% wt CR/Bitumen |
| #7 | 3.0% wt 20A, 2.5% wt SBS, 0.5% wt CR/Bitumen |
| #8 | 1.5% wt SBS, 2.5% wt CR/Bitumen |
| #9 | 3.0% wt 20A, 1.5% wt SBS, 2.5% wt CR/Bitumen |
| #10 | 1.5% wt SBS, 1.5% wt CR/Bitumen |
| #11 | 3.0% wt 20A, 1.5% wt SBS, 1.5% wt CR/Bitumen |

Table 1 summarizes the different compositions synthesized and tested; the total amount of polymer additives is kept around 3% wt to keep the cost of the final product low and avoid potential large-scale phase separation under storage conditions of the samples. Frequency sweep at 25 and 60° C. rheological measurements were performed in order to study the linear viscoelastic behavior of the different systems. FIGS. 1a and 1b summarizes the rheological properties of all systems measured at 60° C. and 0.1 and 100 rad/sec, respectively. The polymer-modified binders show substantially higher modulus compared to the neat bitumen (subjected to the same thermal treatment). The increase is even higher for all samples containing nanoclay (labeled with upward diagonals).

Figure 2:
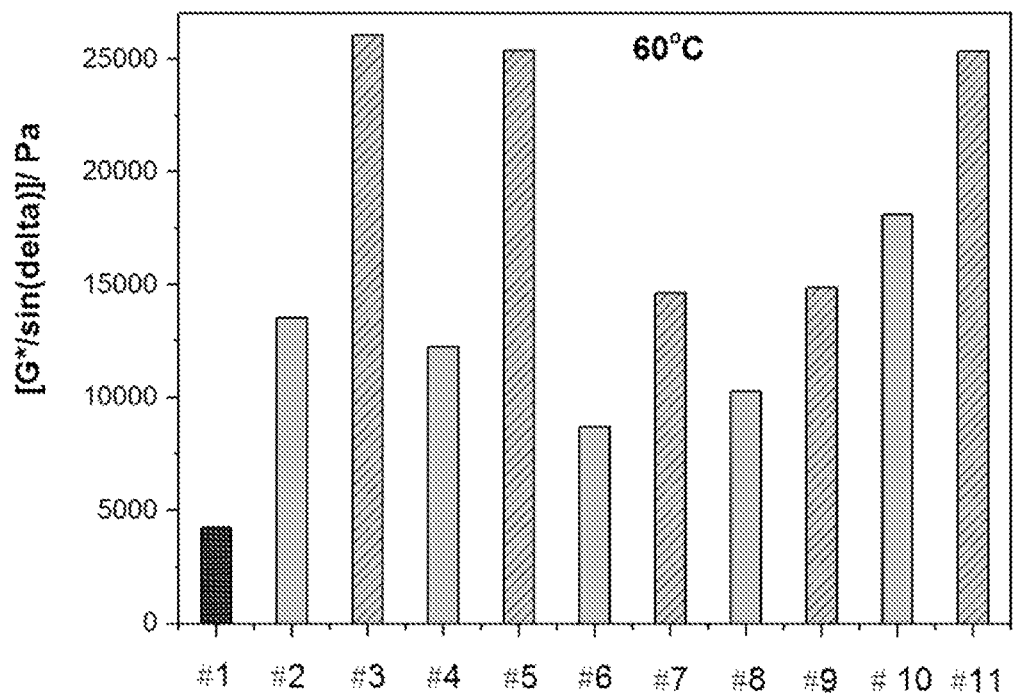
FIG. 2 show rutting factor, $G^*/\sin \delta$, for the systems studied. The compositions are summarized in Table 1.
Figure 3:
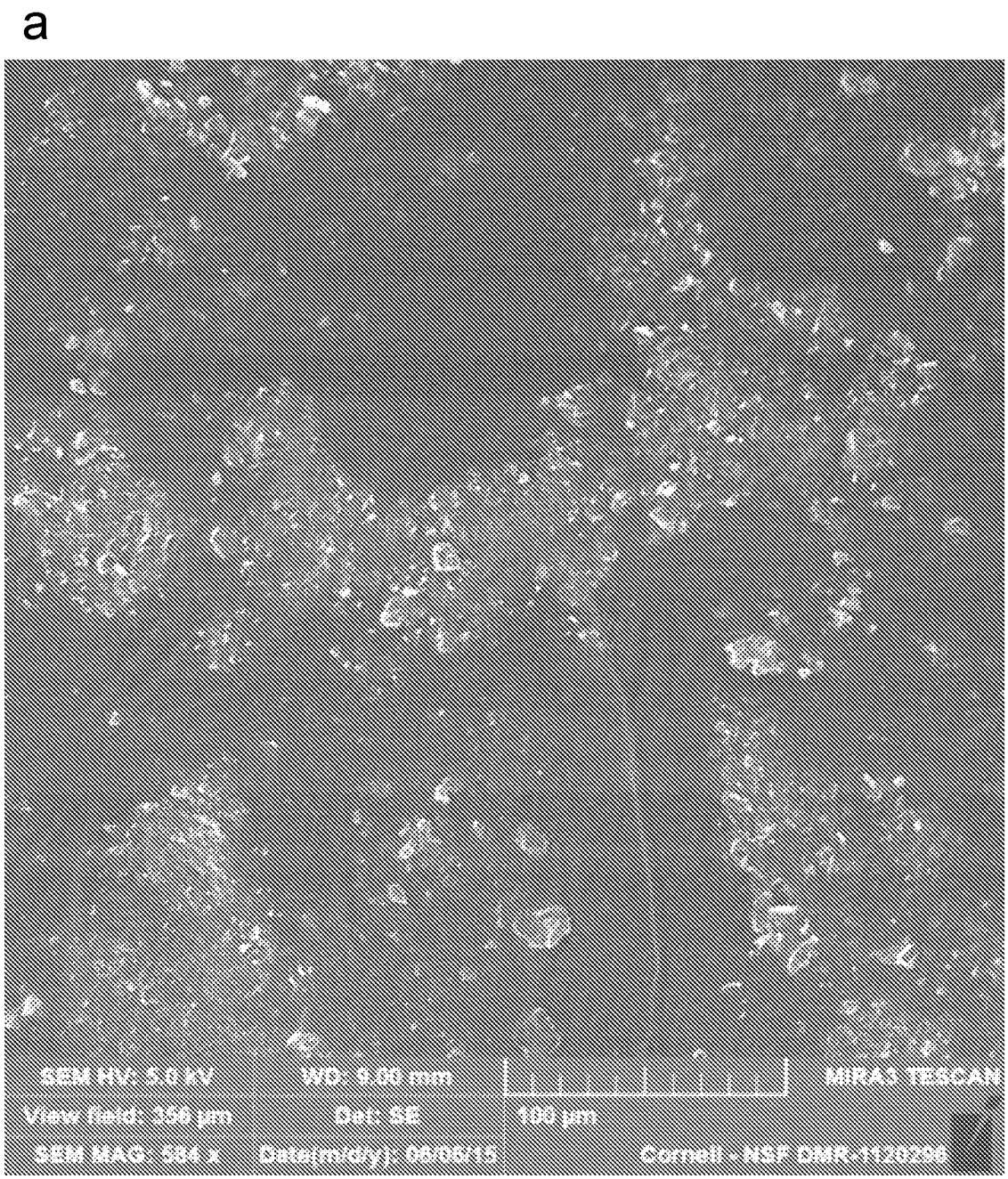
FIG. 3 shows SEM micrographs of samples fractured with liquid nitrogen: (a,b) samples #2, #3, (c,d) #10, #11.
Figure 3:
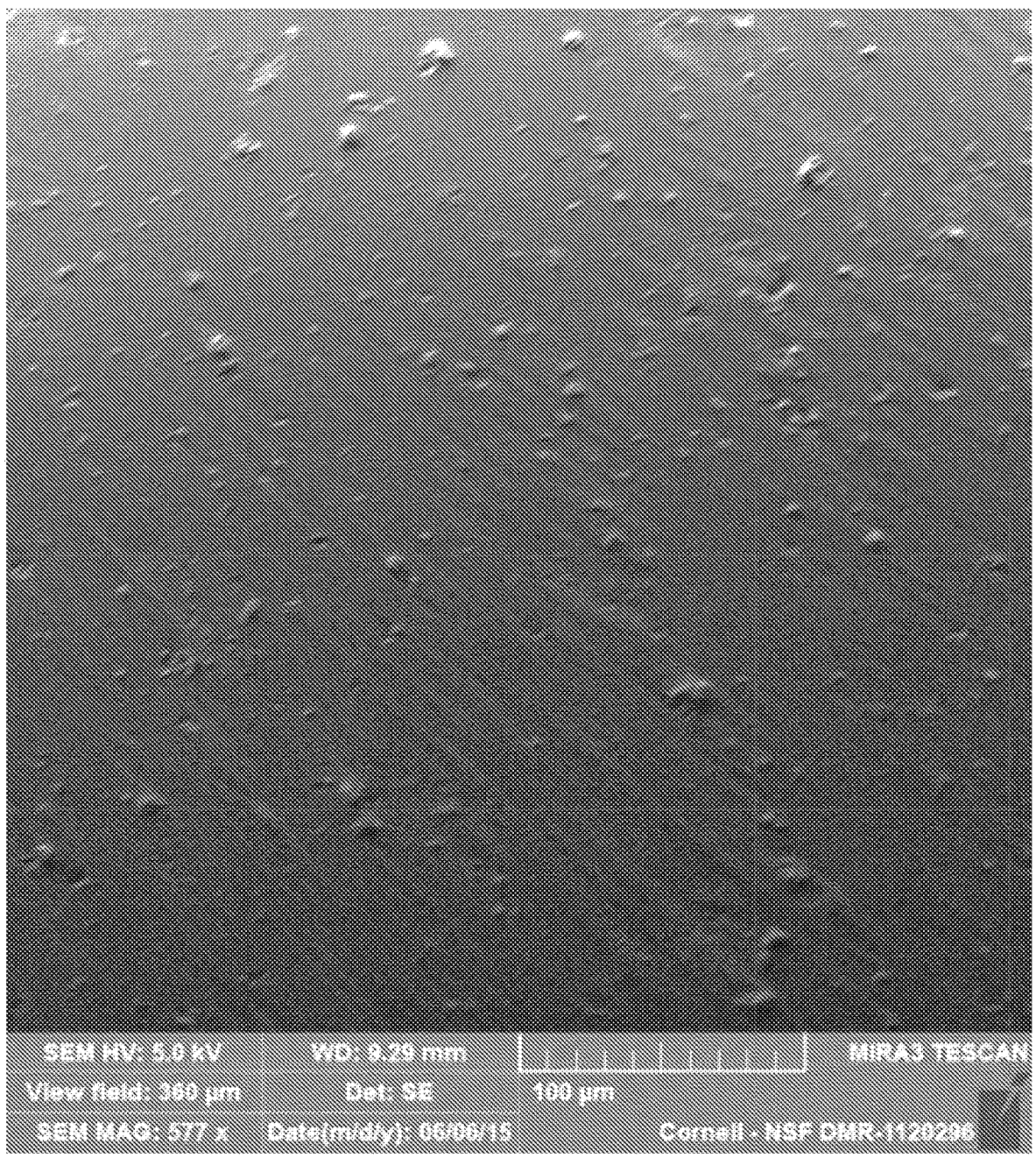
Figure 3:
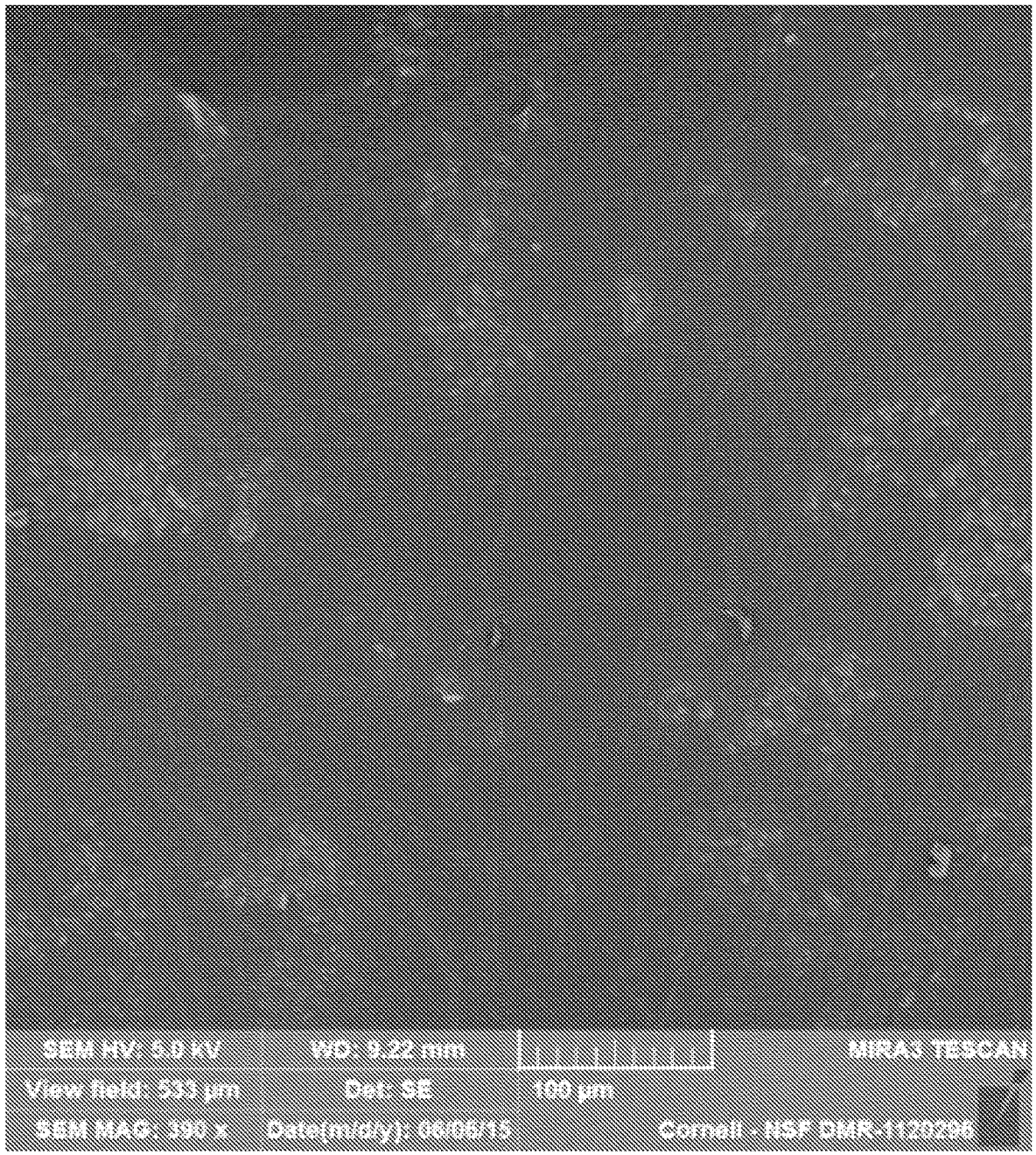
Figure 3:
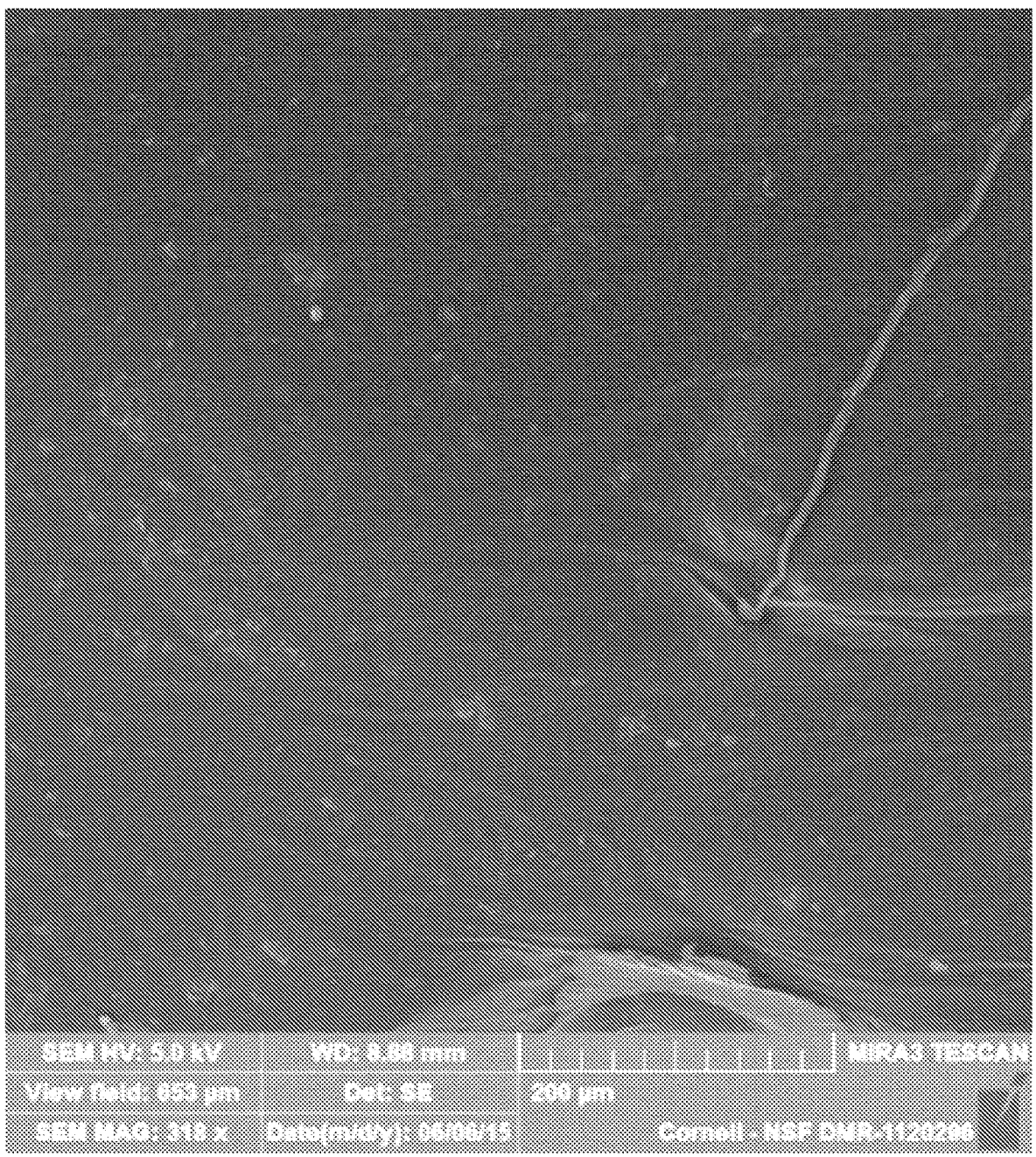

G* reflects the total stiffness and provides a measure of the total resistance to deformation, when the asphalt binder is subjected to shear loading. The modified binders seem to be more resistant to rutting. A metric that is typically used to evaluate the propensity of a matrix to rut is the so-called rut factor defined as the ratio of $G^*/\sin \delta$. A high $G^*/\sin \delta$ ratio is preferred to avoid permanent deformation especially in warm weather, which translates to high complex modulus, G*, and low loss angle, δ. The requirement for $G^*/\sin \delta$ is >1000 Pa at 10 rad s$^{-1}$ at 60° C. This minimum requirement was satisfied for all samples tested including the neat bitumen matrix (FIG. 2). Consistent with the increases in G*, adding a polymer in bitumen improves the rut factor. Importantly, huge increases and the best values are observed for the nanocomposites containing clay.

Based on an interest in substituting part of SBS with CR and developing binders with enhanced performance and improved stability, it was noted that the binder composition based on 1.5% wt SBS and 1.5% wt CR provided desirable results. Hence, in the remaining description, the focus is mainly on comparing and contrasting these samples to those based on 3% wt SBS (same polymer additive but no CR).

Morphology. See, e.g., FIGS. 3(a)-(d).

SEM micrographs of fractured samples are shown in FIGS. 3(a)-(d). Low magnification images were chosen in order to provide a more representative view of the texture. In both pairs, the morphology of the nanocomposite samples with clay (b, d) appears finer and more uniform, compared to those without clay. At the same time sample # 10 (modified with the SBS/CR blend) appears to be smoother than sample #2 (modified with SBS only). Note that the smoothness of the samples correlates with the higher moduli seen above. We hypothesize that the higher moduli values in the nanocomposites might be due to the better dispersion of the polymer additives, which is enhanced by the clay nanoparticles. That is the nanoclay serves a dual role: compatibilizer between the two polymers and bitumen and as mechanical reinforcement.

A previous report described bitumen as a colloidal dispersion of asphaltene micelles in maltenes (saturates, aromatics, resins). These micelles are thought to be stabilized by resins, which constitute the polar components of maltenes. Oversimplifying somewhat the structural model for bitumen, we might assume that in neat (clay-free) bitumen, asphaltenes are surrounded by resins, which stabilize the structure by compatibilizing polar asphaltenes with the nonpolar remaining fractions. It is possible that in our case the nanoclay, has a strong compatibility with the resins; the latter hypothesis is consistent with that resins are usually separated from maltenes by preparative liquid chromatography via adsorption on surface-active materials such as fuller's earths, attapulgite clay, alumina, or silica gel.

Figure 4:
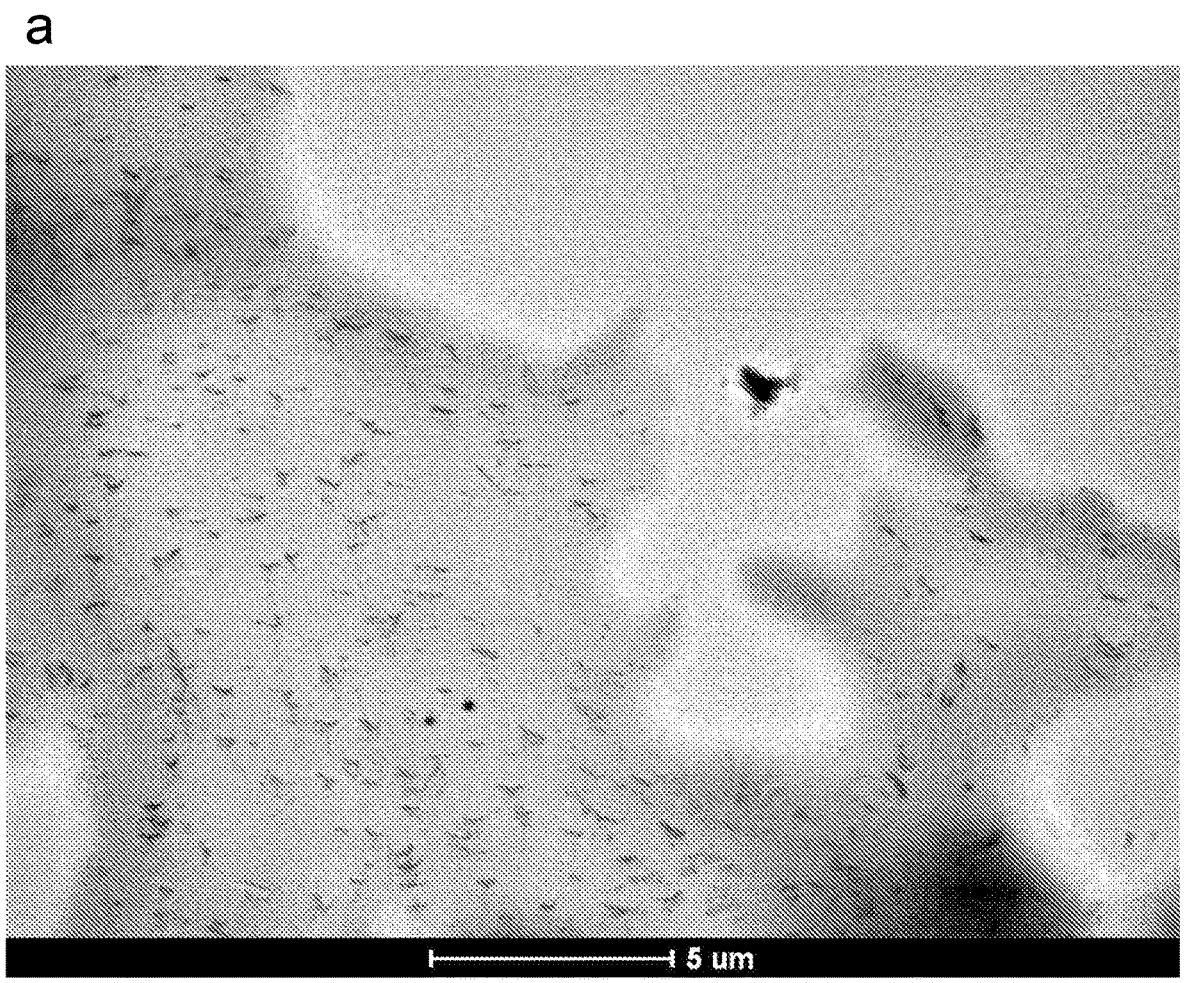
FIG. 4 shows $OsO_4$ stained TEM images for 1.5% SBS/ 1.5% CR (a, top) and clay nanocomposite based on 1.5% SBS/1.5% CR (b, bottom).
Figure 4:
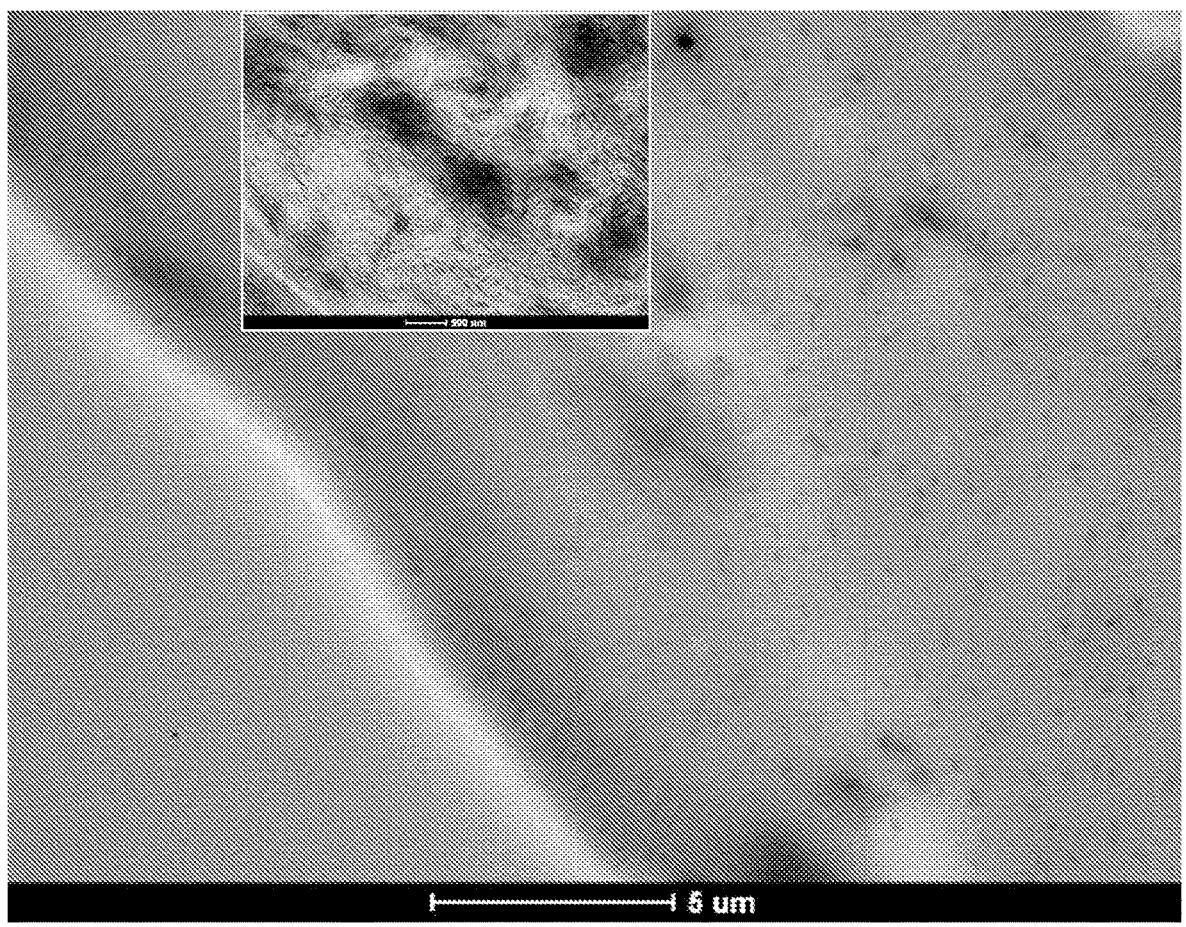

Additional microstructure information is provided by TEM imaging (FIG. 4). To improve contrast the samples were stained with $OsO_4$. The complexity of bitumen chemistry lies in the fact that many different chemicals are present. As an overall descriptor, the chemical nature of the crude oil is generally described as paraffinic, naphthenic or aromatic, if a majority of saturated, cyclic or aromatic molecules, respectively, are present. Osmium tetroxide reacts with double-bonds. It reacts readily with ethylenic double bonds and more slowly with certain aromatic "double" bonds, to form organo-osmium compounds. The addition to these aromatic bonds takes place much more slowly compared to ethylenic bonds and to be more precise only the most reactive react. For instance, while benzene does not react under usual conditions, one bond is usually attacked in more reactive polycyclic compounds, as is the case with phenanthrene.

Figure 5:
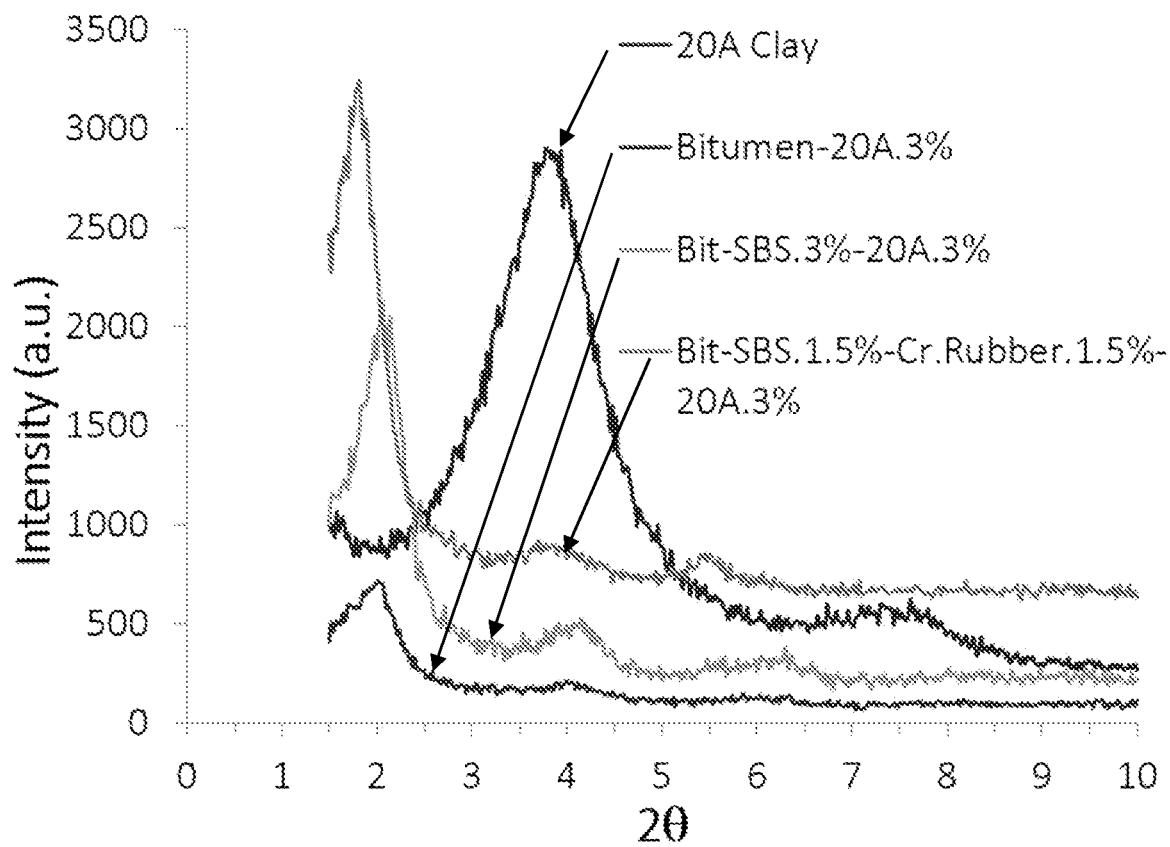
FIG. 5 shows XRD patterns of pristine clay and modified binders. All the nanocomposite systems show an intercalated morphology.

FIG. 4a shows a TEM image of bitumen containing CR and SBS. The image is dominated by elongated features resembling small flakes of more or less uniform dimensions presumably due to the SBS/CR blend of polymer additives. Interestingly, addition of nanoclay (FIG. 4b) leads to smaller and more rounded features suggesting better dispersion of the additives in the presence of the nanoclay. The larger features in the image are due to the clay nanoparticles, for which X-ray diffraction (FIG. 5) reveals an intercalated structure, when added to the bitumen matrix. No substantial changes are seen in the diffraction pattern from matrices based on neat bitumen or those containing SBS or SBS/CR.

Figure 6:
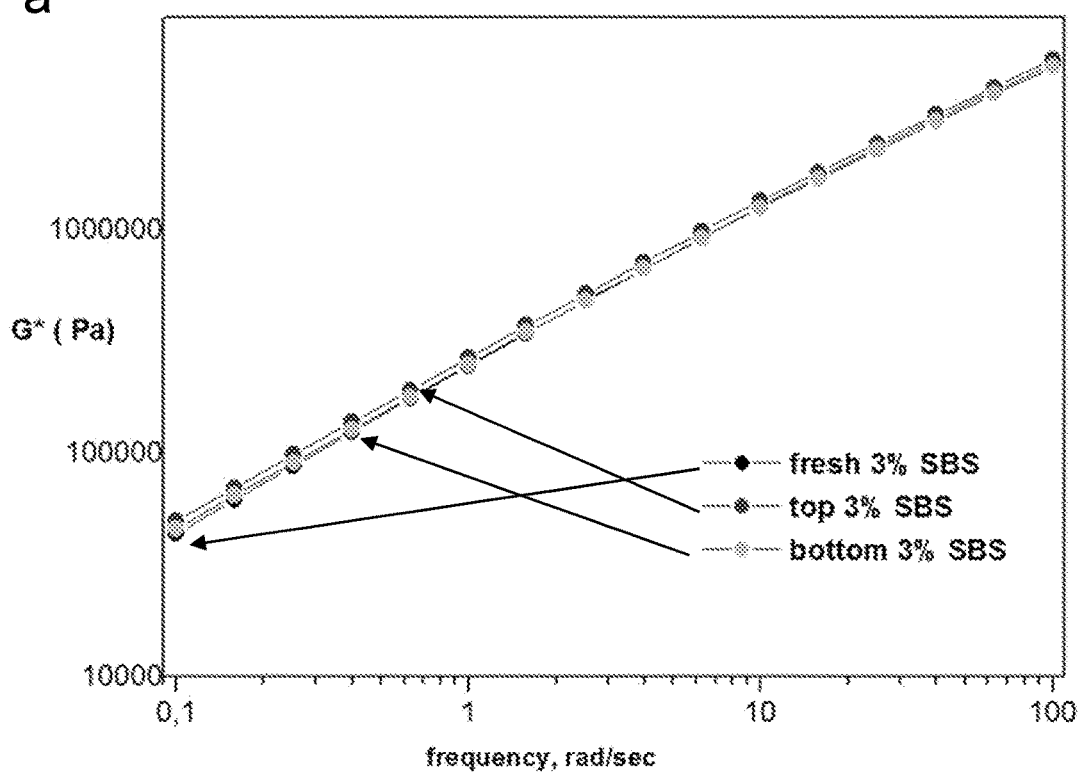
FIG. 6 shows storage stability performance of 3.0% wt. SBS (a, top) (no clay) and of 3% wt clay –3.0% wt SBS (b, bottom).
Figure 6:
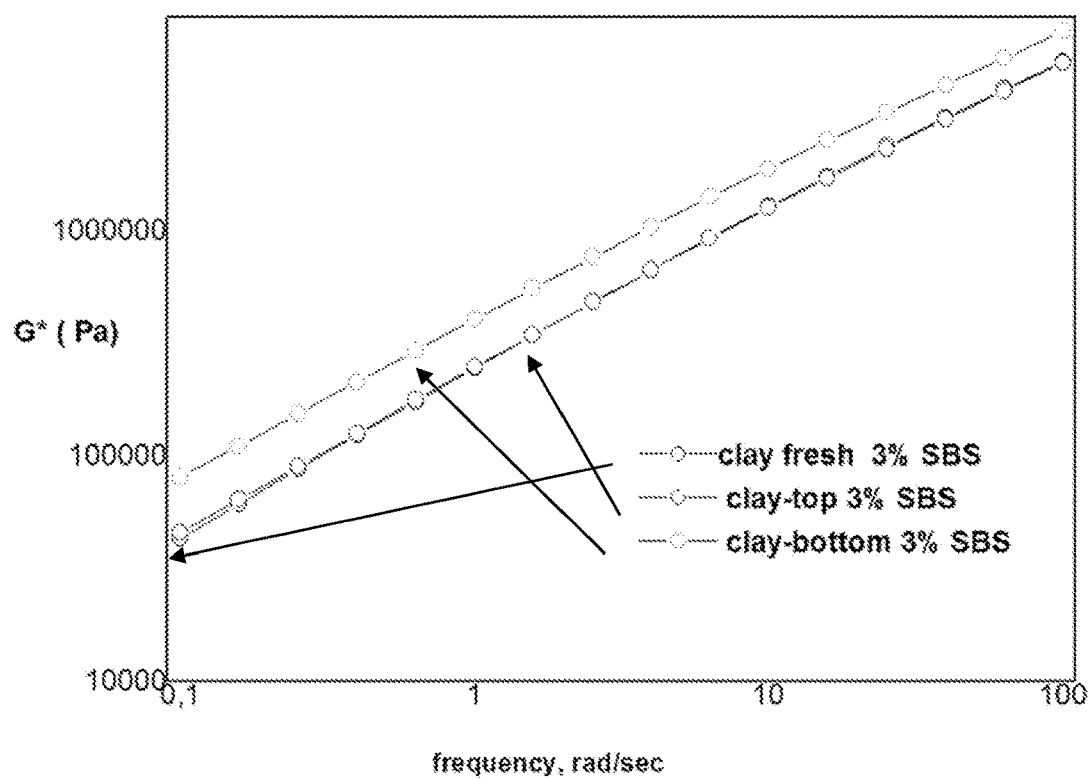

Storage Stability. Storage stability was evaluated using the ASTM D5892-00 standard. In the test we compare the complex modulus of the top and bottom parts of an aged sample (as in the Storage Stability Tests discussion above) to a fresh one using rheological measurements. Any settling will undoubtedly lead to a change in the modulus of the different parts. Bitumen samples modified with 3% SBS show no separation consistent with previous findings. See for instance FIG. 6a, where there is virtually no difference between the aged and fresh samples. Nevertheless, and despite the aging stability, bitumen modified with low content of SBS, suffers from poor mechanical properties (see discussion below). Addition of clay (sample #3) improves the mechanical properties and shows good rutting factor but is still prone to phase separation under storage conditions (FIG. 6b). Previous reports worked extensively with SBS (linear as well as branched) and nanoclays. They found that on using SBS:Nanoclay=4:1 there was an improvement in storage stability although some instability was always observed. Use of more nanoclay didn't result in any further improvements and the samples suffered from poor shelf-life and precipitation of excess nanoclay after 48 h of storage.

Figure 7:
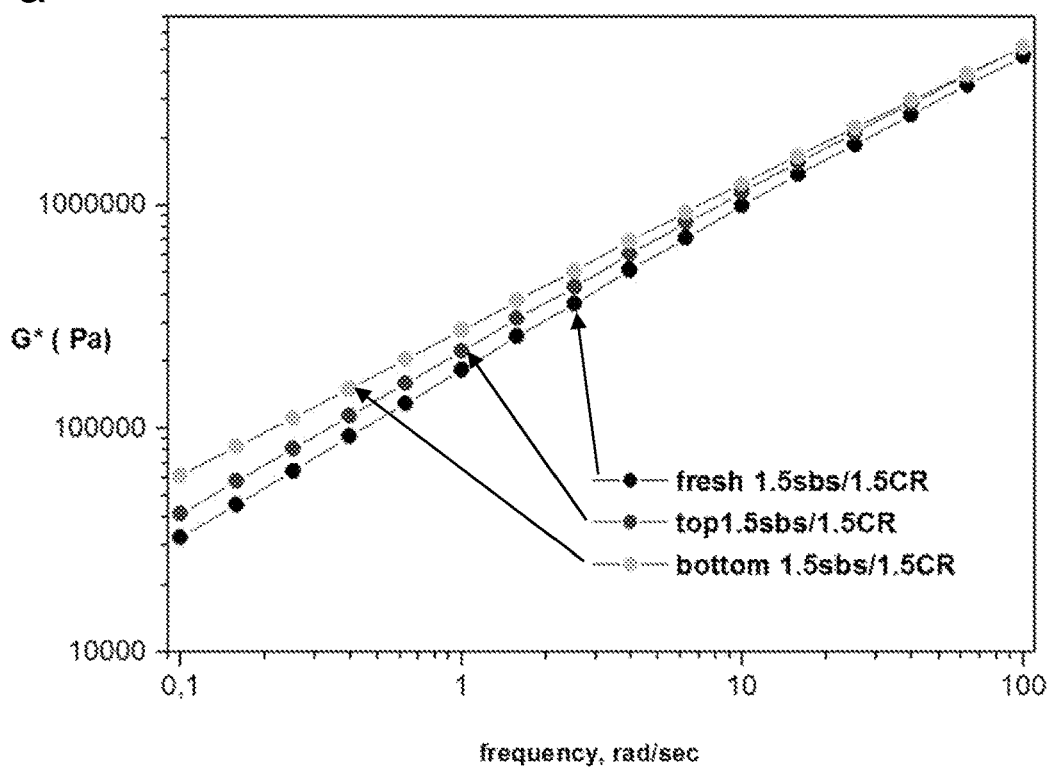
FIG. 7 shows storage stability of 1.5% SBS/1.5% CR (a, top) and 1.5% SBS/1.5% CR clay (b, bottom).
Figure 7:
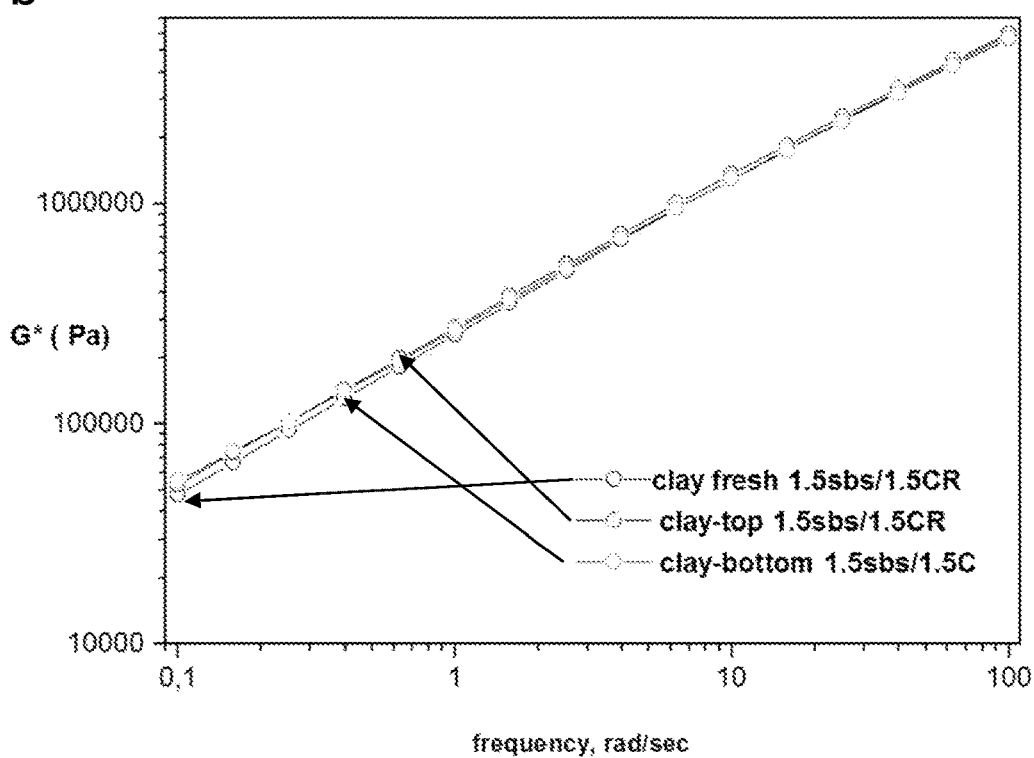

Recall that one of the goals was to substitute part of SBS with the less expensive CR. However, as FIG. 7a shows SBS/CR-modified bitumen samples suffer from poor storage stability. In general, CR modified bitumen samples suffer from poor storage stability because of rubber crumb particles settling. Shearing the mixture at high temperatures improves the storage stability but at the same time leads to depolymerization. Using very fine particles under high shear mixing prevents sedimentation, but these binders show a faster viscosity reduction during heating due to faster swelling, which accelerates the depolymerization process.

To overcome the issues described above researchers previously proposed combining CR with SBS. A previous report used different combinations and higher concentrations of SBS and CR. Nevertheless, all their samples finally phase separate and settle. Typically, CR particles settle down quickly though in some reports CR particles are reported to migrate to the top of the storage tubes.

To minimize gravity issues we have used CR particles of medium size (ca 600 μm). The CR particles, produced by grinding rubber at ambient conditions, are more porous and have much higher surface area compared to CR produced by cryogenic techniques. In a suspension each particle experiences, in addition to gravitational forces, a combination of buoyancy and friction forces. The latter are influenced by the flow field and pressure distribution in the vicinity of each particle and, therefore, by the presence of neighboring particles. As FIG. 7b demonstrates addition of nanoclay stabilizes the CR-SBS containing bitumen against aging probably because of stronger interactions, which reduce settling.

Figure 8:
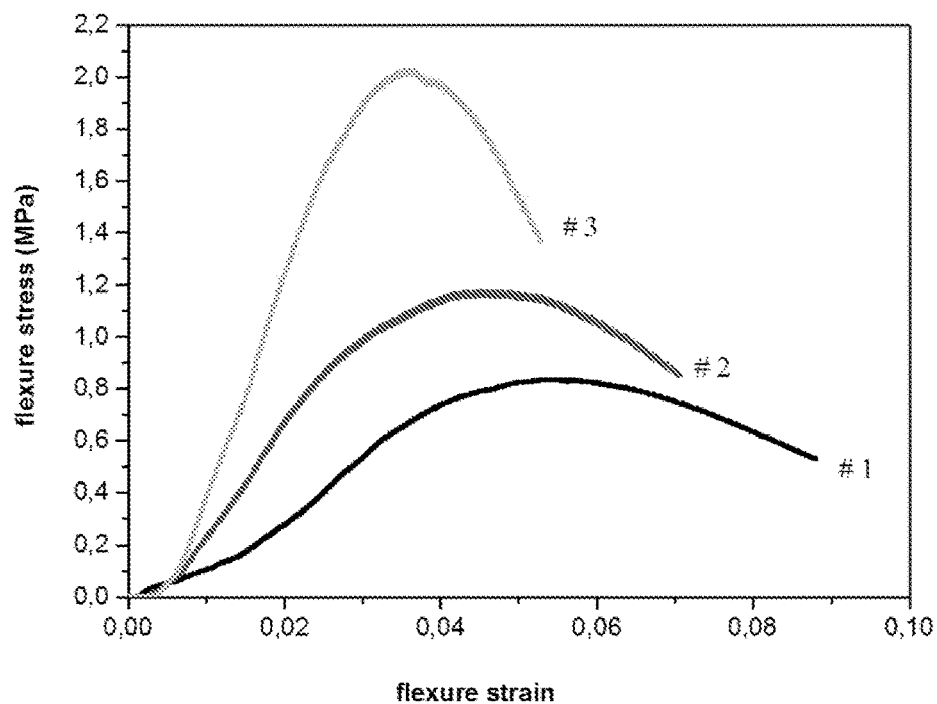
FIG. 8 shows results of flexural stress-strain tests at room temperature for selected compositions (a-c).
Figure 8:
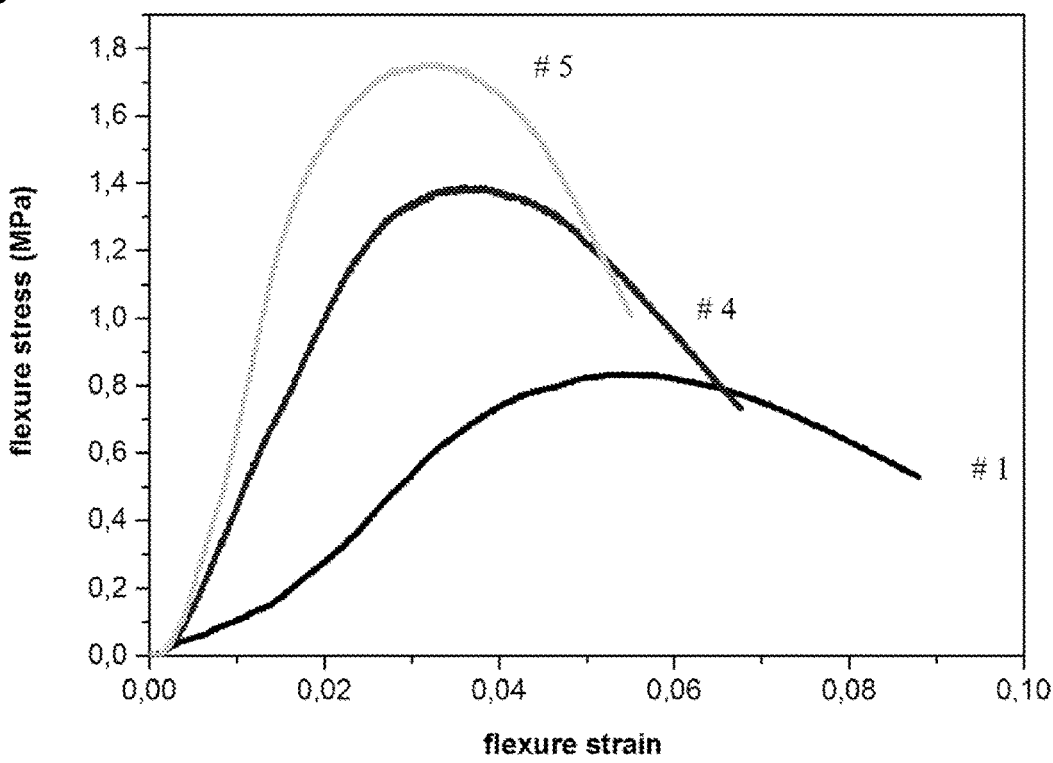
Figure 8:
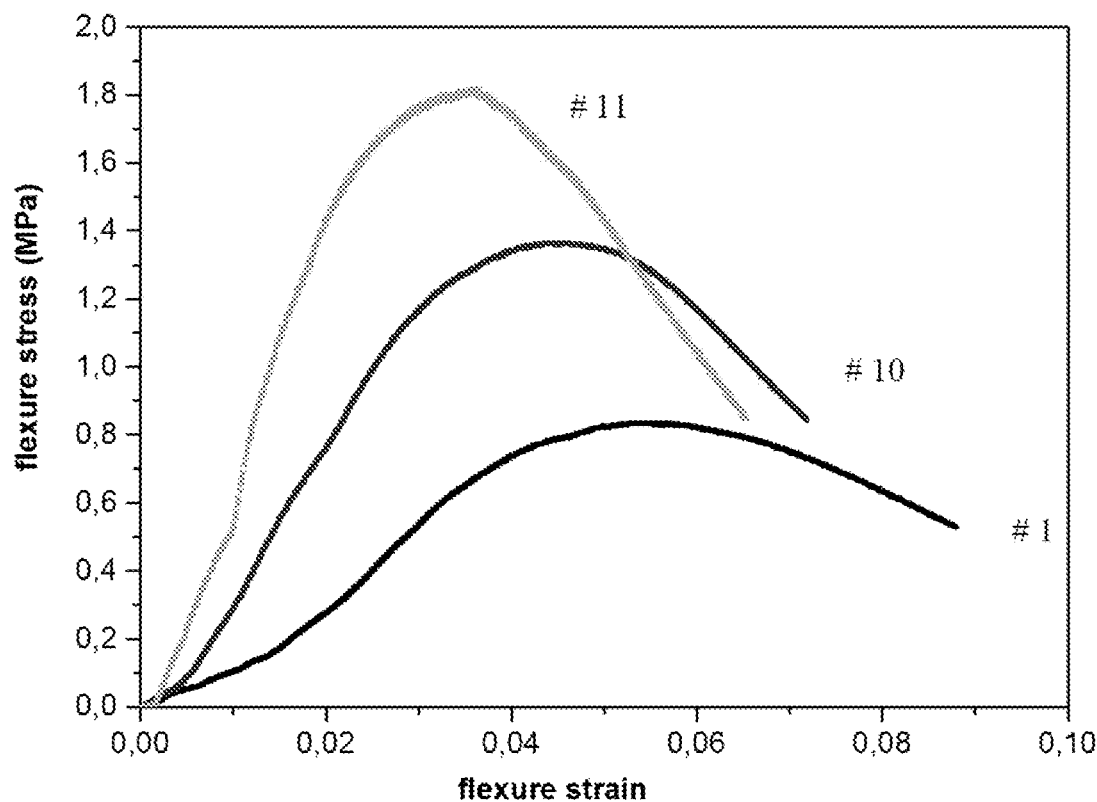

Mechanical testing & Water Susceptibility Results. All studies up to now have been performed using the binder only. A key consideration is how the materials perform, when mix with the aggregate. To that end we have prepared and evaluated a series of samples with different binders and concrete sand. Recall that the rheological measurements discussed earlier showed that the nanocomposite binders are stiffer at both room and elevated temperatures. 3-point bending flexural testing was employed to evaluate the aggregate containing samples. For each measurement at least four specimens were tested for reproducibility. Consistent with the rheological measurements, the modulus of the bitumen-aggregate nanocomposites is higher compared to the neat bitumen or samples containing only the polymer additives (SBS or CR). More importantly, the strength of the clay containing nanocomposites is the highest amongst all samples. For simplicity and readability FIG. 8 shows 3 of the systems. Details of all samples are given in Table 2. The bitumen/aggregate nanocomposite based on SBS/CR-modified bitumen shows more than 400% increase in strength compared to that based on neat bitumen consistent with the results of the matrix alone.

TABLE 2

Comparison of flexural moduli of all samples to neat bitumen.

| Sample | % Increase | Sample # |
|---|---|---|
| Bitumen | — | 1 |
| 3.0% wt SBS/Bitumen | 77% | 2 |
| 3.0% wt 20A, 3.0% wt SBS/Bitumen | 257% | 3 |
| 2.0% wt SBS, 1.0% wt CR/Bitumen | 136% | 4 |
| 3.0% wt 20A, 2% wt SBS, 1.0% wt CR/Bitumen | 375% | 5 |

TABLE 2-continued

Comparison of flexural moduli of all samples to neat bitumen.

| Sample | % Increase | Sample # |
|---|---|---|
| 2.5% wt SBS, 0.5% wt CR/Bitumen | 148% | 6 |
| 3.0% wt 20A, 2.5% wt SBS, 0.5% wt CR/Bitumen | 305% | 7 |
| 1.5% wt SBS, 2.5% wt CR/Bitumen | 147% | 8 |
| 3.0% wt 20A, 1.5% wt SBS, 2.5% wt CR/Bitumen | 230% | 9 |
| 1.5% wt SBS, 1.5% wt CR/Bitumen | 95% | 10 |
| 3.0% wt 20A, 1.5% wt SBS, 1.5% wt CR/Bitumen | 419% | 11 |

To further evaluate the durability of the materials all samples were subjected to a modified Texas Freeze-Thaw Test. After each cycle, the samples were examined for cracking and finally tested by three-point bending after 7 full freeze thaw cycles. In parallel, samples containing only the binder (no sand aggregate) were subjected to the same cycling conditions and strain sweep tests for the fresh and thermo-cycled samples were performed. For both systems (SBS and SBS/CR modified) the only effect of thermocycling was an increase in stiffness, which is consistent with previous studies of the effect of accelerated aging of SBR composites filled with SBR scraps.

Figure 9:
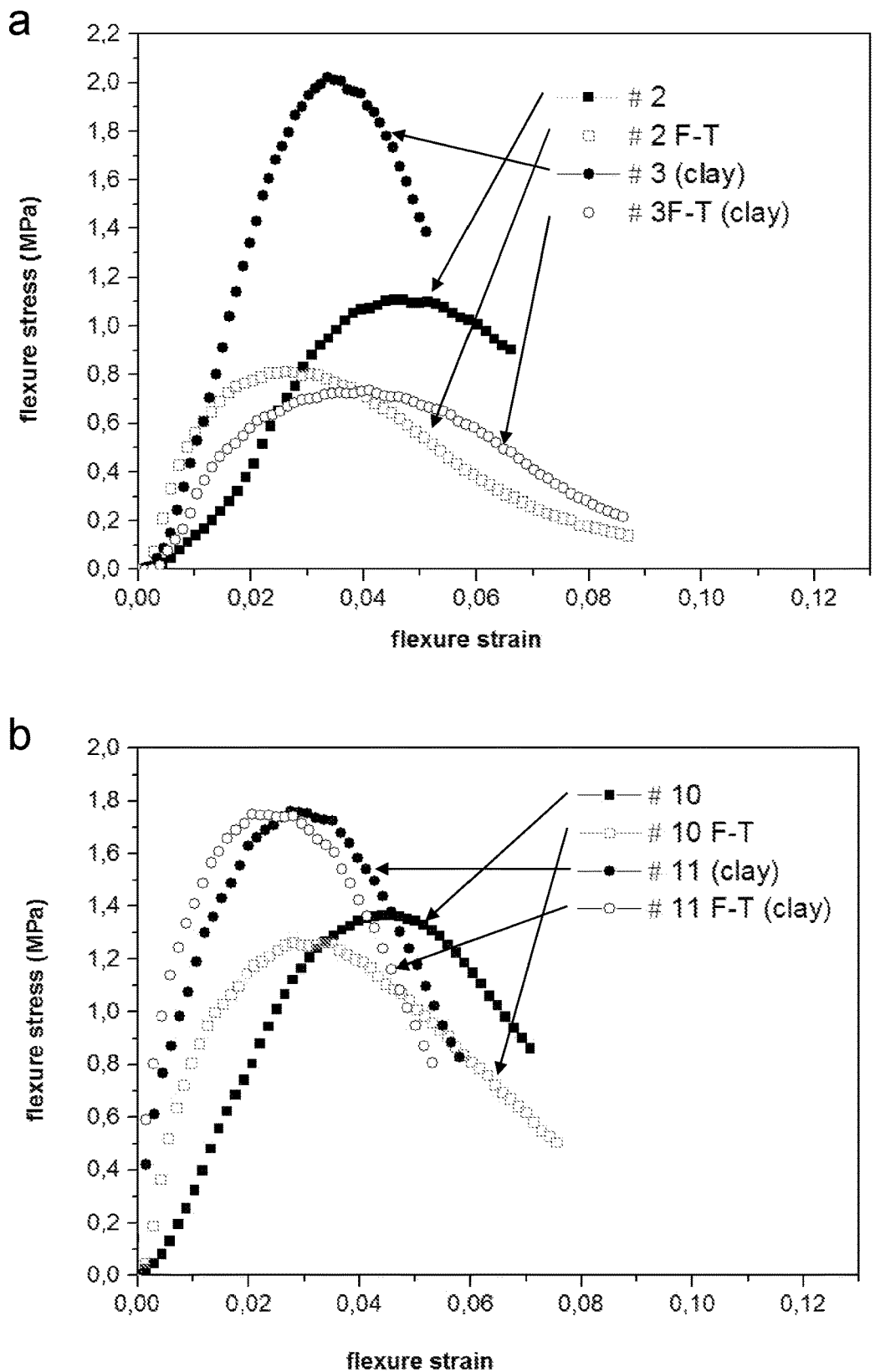
FIG. 9 shows results of three point flexural test for fresh samples after freeze-thaw cycling for SBS (a, top) and SBS-CR based samples (b, bottom).

FIG. 9a shows the flexural stress-strain test at room temperature for SBS-bitumen (#2) and clay-SBS-bitumen (#3) before and after thermocycling (F-T). While both samples deteriorate after thermocycling, the nanocomposite appears to suffer the largest decrease almost erasing the performance improvement seen for the fresh samples. In contrast, the nanocomposites based on samples containing CR-SBS appear stable remaining more or less unchanged after thermocycling (FIG. 9b). Interestingly, it was previously reported that blends with even low percentage of reclaimed rubber are less sensitive to changes upon aging, compared to those without CR.

Different compositions of SBS/CR blends in bitumen and the corresponding clay nanocomposites were synthesized and studied. It was shows that CR can effectively substitute part of SBS, which is an effective but costly polymeric modifier. Clay nanocomposites based on the polymer blend binders show an outstanding improvement of mechanical properties and cycling performance; the clays act as compatibilizers between the two polymers and bitumen and lead to a stable system under storage conditions. The enhanced properties were attributed to a better dispersion of the additives in bitumen in the presence of the nanoclay. In addition to the significantly practical applications in bitumen systems such as asphalt, this work provides basis for substitution of copolymers and other polymer additives with the lower cost crumb rubber taking advantage of the stabilization effect of inorganic nanoparticles. Furthermore, finding uses for the low-cost crumb rubber derived from discarded tires, minimizes a significant environmental issue and waste disposal problem.

The invention claimed is:

1. A bitumen clay nanocomposite comprising:
   0.5 to 5% by weight based on the total weight of the composition of a clay in the bitumen clay nanocomposite, wherein the clay comprises an organo-modified montmorillonite;
   1 to 20% by weight based on the total weight of the composition of a polymer composition in the bitumen clay nanocomposite, wherein the polymer composition comprises 10 to 90% by weight of irregularly shaped crumb rubber having an average particle size of 100 microns to 1,000 microns and 10 to 90% by weight of one or more styrenic polymer and/or styrenic copolymer in the polymer composition; and
   70 to 98.5% by weight based on the total weight of the composition of a bitumen in the bitumen clay nanocomposite,
   wherein the bitumen clay nanocomposite exhibits no observable phase separation for at least 24 hours.

2. The bitumen clay nanocomposite of claim 1, wherein the bitumen clay nanocomposite exhibits no observable phase separation for at least 48 hours.

3. The bitumen clay nanocomposite of claim 1, wherein the bitumen clay nanocomposite exhibits no observable phase separation for at least 60 hours.

4. The bitumen clay nanocomposite of claim 1, wherein the bitumen clay nanocomposite exhibits no observable phase separation for at least 5 days.

5. The bitumen clay nanocomposite of claim 1, wherein the bitumen clay nanocomposite has a complex modulus greater than 450 Pa measured at 0.1 rad/sec at 60° C. or a complex modulus of 110,000 Pa or greater measured at 100 rad/sec at 60° C.

6. The bitumen clay nanocomposite of claim 1, wherein the bitumen clay nanocomposite has a rutting factor of 20,000 [G*/sin(delta)]/Pa or greater measured at 10 rad/sec at 60° C.

7. The bitumen clay nanocomposite of claim 1, wherein the polymer composition is present at 1 to 5% by weight.

8. The bitumen clay nanocomposite of claim 1, wherein the bitumen clay nanocomposite comprises 1 to 3% by weight of the polymer composition.

9. The bitumen clay nanocomposite of claim 1, wherein the styrenic polymer comprises 10 to 50 percent by weight styrenic moieties.

10. The bitumen clay nanocomposite of claim 8, wherein the styrenic polymer comprises one or more maleic anhydride group.

11. The bitumen clay nanocomposite of claim 1, wherein the styrenic polymer is a styrenic block copolymer.

12. The bitumen clay nanocomposite of claim 11, wherein the styrenic block copolymer comprises one or more polybutadiene block, one or more polyisoprene block, one or more polyethylene block, one or more polybutylene block, one or more polypropylene block, or a combination thereof.

13. The bitumen clay nanocomposite of claim 11, wherein the styrenic block copolymer has one or more maleic anhydride group covalently bonded thereto.

14. The bitumen clay nanocomposite of claim 1, wherein the bitumen clay nanocomposite comprises 1-3% by weight of the polymer composition.

15. The bitumen clay nanocomposite of claim 1, wherein the one or more styrenic polymer and/or styrenic copolymer comprises styrene-butadiene-styrene triblock.

16. A road surfacing product comprising one or more bitumen clay nanocomposite of claim 1; and one or more mineral aggregates comprising sand, stone, or both.

17. The road surfacing product of claim 16, wherein the road surfacing product is an asphalt.

18. A roofing product or waterproofing product comprising one or more bitumen clay nanocomposite claim 1.

19. A bitumen clay nanocomposite consisting of:
   0.5 to 5% by weight based on the total weight of the composition of a clay in the bitumen clay nanocomposite, wherein the clay comprises an organo-modified montmorillonite;

1 to 20% by weight based on the total weight of the composition of a polymer composition in the bitumen clay nanocomposite, wherein the polymer composition comprises 10 to 90% by weight of irregularly shaped crumb rubber having an average particle size of 100 microns to 1,000 microns and 10-90% by weight of one or more styrenic polymer and/or styrenic copolymer in the polymer composition; and 70 to 98.5% by weight based on the total weight of the composition of a bitumen in the bitumen clay nanocomposite, wherein the bitumen clay nanocomposite exhibits no observable phase separation for at least 24 hours.

20. A bitumen clay nanocomposite consisting of:

0.5 to 5% by weight based on the total weight of the composition of a clay in the bitumen clay nanocomposite;

1 to 20% by weight based on the total weight of the composition of a polymer composition in the bitumen clay nanocomposite, wherein the polymer composition comprises 10 to 90% by weight of crumb rubber and 10 to 90% by weight of one or more styrenic polymer and/or styrenic copolymer in the polymer composition; and 70 to 98.5% by weight based on the total weight of the composition of a bitumen in the bitumen clay nanocomposite, wherein the bitumen clay nanocomposite exhibits no observable phase separation for at least 24 hours.

* * * * *